United States Patent
Cox

(10) Patent No.: US 10,625,711 B2
(45) Date of Patent: Apr. 21, 2020

(54) VEHICLE SAFETY SYSTEM

(71) Applicant: Archie Cox, Seffner, FL (US)

(72) Inventor: Archie Cox, Seffner, FL (US)

(*) Notice: Subject to any disclaimer, the term of this patent is extended or adjusted under 35 U.S.C. 154(b) by 175 days.

(21) Appl. No.: 15/848,231

(22) Filed: Dec. 20, 2017

(65) Prior Publication Data

US 2019/0184934 A1 Jun. 20, 2019

(51) Int. Cl.
*B60R 22/48* (2006.01)
*B60R 22/18* (2006.01)

(52) U.S. Cl.
CPC ...... *B60R 22/48* (2013.01); *B60R 2022/1806* (2013.01); *B60R 2022/4816* (2013.01); *B60R 2022/4858* (2013.01); *B60R 2022/4891* (2013.01)

(58) Field of Classification Search
CPC ............ B60R 22/48; B60R 2022/4816; B60R 2022/4858; B60R 2022/1806; B60R 2022/4891; B60R 2022/4883
See application file for complete search history.

(56) References Cited

U.S. PATENT DOCUMENTS

| | | | |
|---|---|---|---|
| 3,845,261 A | 10/1974 | Blinkilde | |
| 3,883,843 A | 5/1975 | Telmet et al. | |
| 3,934,671 A * | 1/1976 | Hart | B60R 22/48 180/270 |
| 4,107,645 A * | 8/1978 | Lewis | B60R 22/48 180/270 |
| 4,785,906 A | 11/1988 | Kang | |
| 4,922,769 A * | 5/1990 | Tury | F16H 59/12 477/125 |
| 5,394,955 A * | 3/1995 | Howard | B60N 2/002 180/273 |
| 6,362,734 B1 * | 3/2002 | McQuade | B60R 22/48 180/267 |
| 6,540,040 B1 * | 4/2003 | Patel | B60R 22/48 180/268 |
| 7,132,934 B2 * | 11/2006 | Allison, III | B60R 22/48 340/438 |
| 7,640,096 B1 | 12/2009 | Poudrier et al. | |

(Continued)

FOREIGN PATENT DOCUMENTS

WO WO2005070731 8/2005

*Primary Examiner* — Paul N Dickson
*Assistant Examiner* — Timothy Wilhelm

(57) ABSTRACT

A vehicle safety system includes a vehicle that has a plurality of seats, a plurality of seat belts, an electrical system and an ignition. Each of the seat belts includes a buckle and a clasp. A plurality of buckle sensors is provided and each of the buckle sensors is coupled to the buckle on an associated one of the seat belts. Each of the buckle sensors senses when the clasp of the associated seat belt is engaged to the buckle of the associated seat belt. A plurality of weight sensors is provided and each of the weight sensors is coupled to an associated one of the seats to sense weight of an occupant in the associated seat. A shut down unit is coupled to the vehicle. The shut down unit is in electrical communication with each of the seat belt sensors, each of the weight sensors and the ignition. The shut down unit turns the ignition off when any of the weight sensors senses an occupant in an associated of the seats and the buckle sensor corresponding to the associated seat does not sense the seat belt of the associated seat is fastened.

4 Claims, 4 Drawing Sheets

(56) References Cited

U.S. PATENT DOCUMENTS

| | | | |
|---|---|---|---|
| 9,650,016 B2* | 5/2017 | Andreen | B60R 22/48 |
| 2002/0078726 A1* | 6/2002 | Muller | B60R 22/48 |
| | | | 70/247 |
| 2003/0098194 A1* | 5/2003 | Roddy | B60R 22/48 |
| | | | 180/270 |
| 2003/0226703 A1 | 12/2003 | Amemiya | |
| 2006/0108167 A1* | 5/2006 | Finger | B60N 2/002 |
| | | | 180/268 |
| 2012/0268259 A1 | 10/2012 | Igel et al. | |
| 2014/0214279 A1 | 7/2014 | Bunton | |

* cited by examiner

VEHICLE SAFETY SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to safety devices and more particularly pertains to a new safety device for inhibiting a vehicle from being operated when occupants are not wearing their seat belts.

BRIEF SUMMARY OF THE INVENTION

An embodiment of the disclosure meets the needs presented above by generally comprising a vehicle that has a plurality of seats, a plurality of seat belts, an electrical system and an ignition. Each of the seat belts includes a buckle and a clasp. A plurality of buckle sensors is provided and each of the buckle sensors is coupled to the buckle on an associated one of the seat belts. Each of the buckle sensors senses when the clasp of the associated seat belt is engaged to the buckle of the associated seat belt. A plurality of weight sensors is provided and each of the weight sensors is coupled to an associated one of the seats to sense weight of an occupant in the associated seat. A shut down unit is coupled to the vehicle. The shut down unit is in electrical communication with each of the seat belt sensors, each of the weight sensors and the ignition. The shut down unit turns the ignition off when any of the weight sensors senses an occupant in an associated of the seats and the buckle sensor corresponding to the associated seat does not sense the seat belt of the associated seat is fastened.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
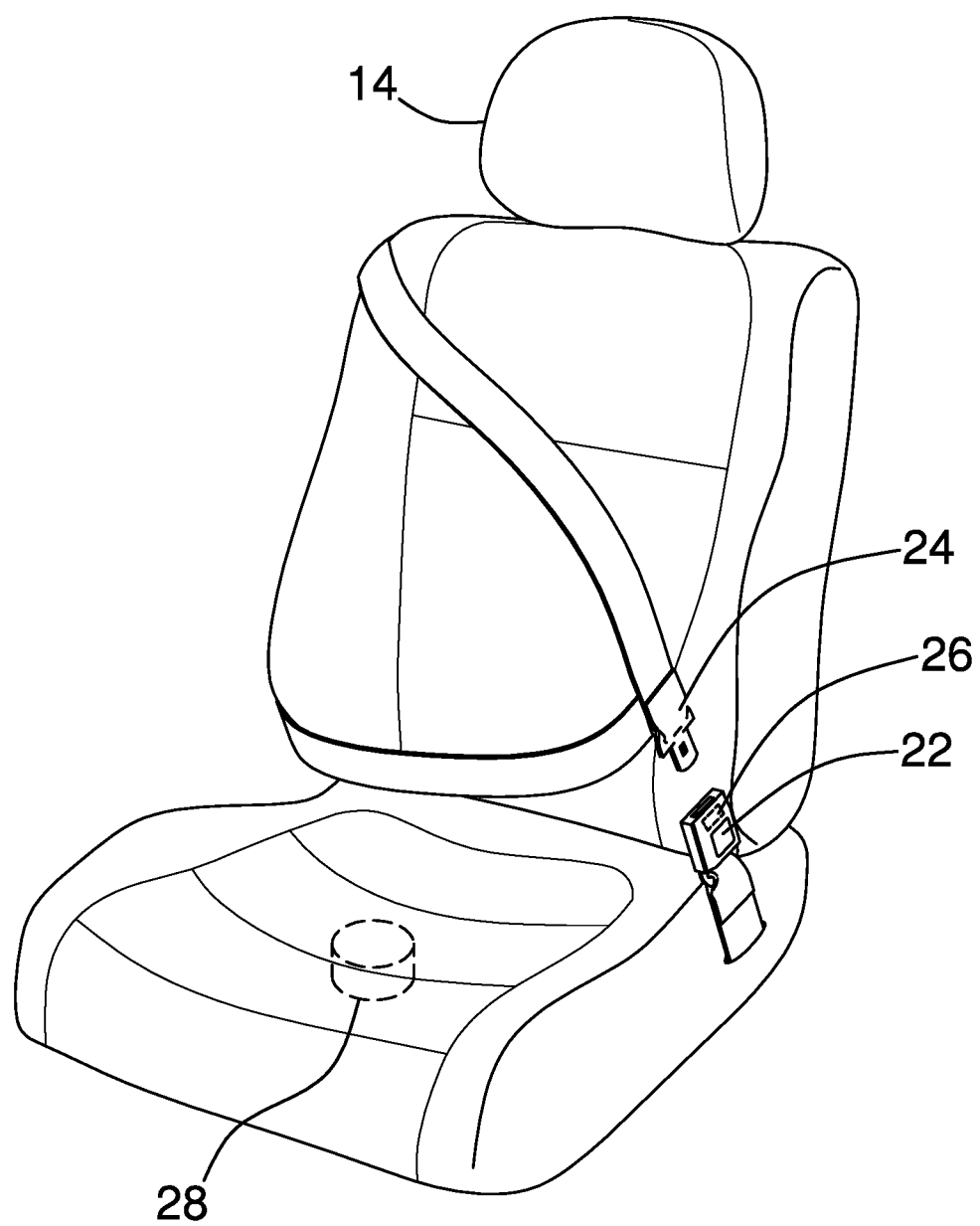
FIG. 1 is a perspective view of a seat and a weight sensor of a vehicle safety system according to an embodiment of the disclosure.
Figure 2:
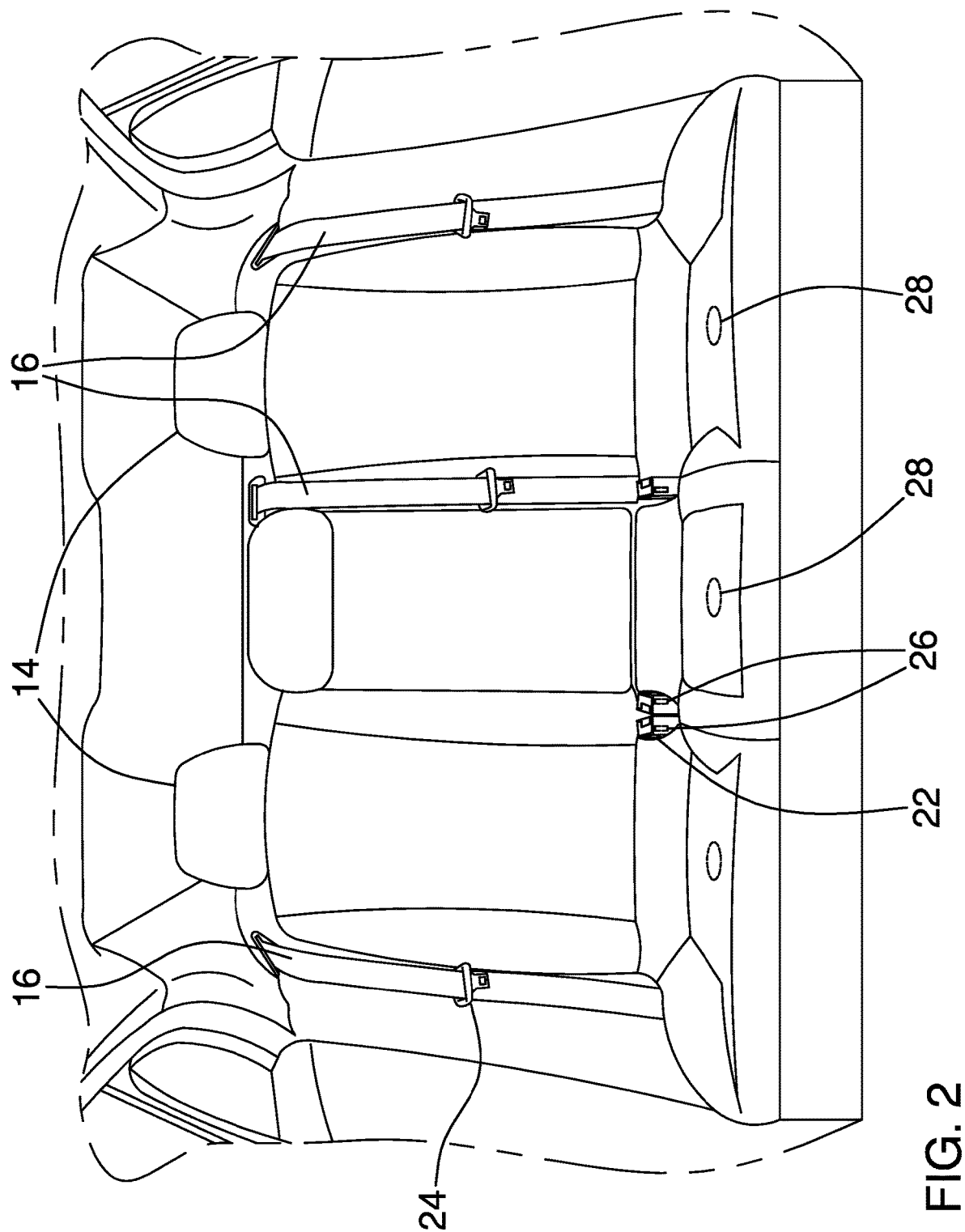
FIG. 2 is a front view of an embodiment of the disclosure.
Figure 3:
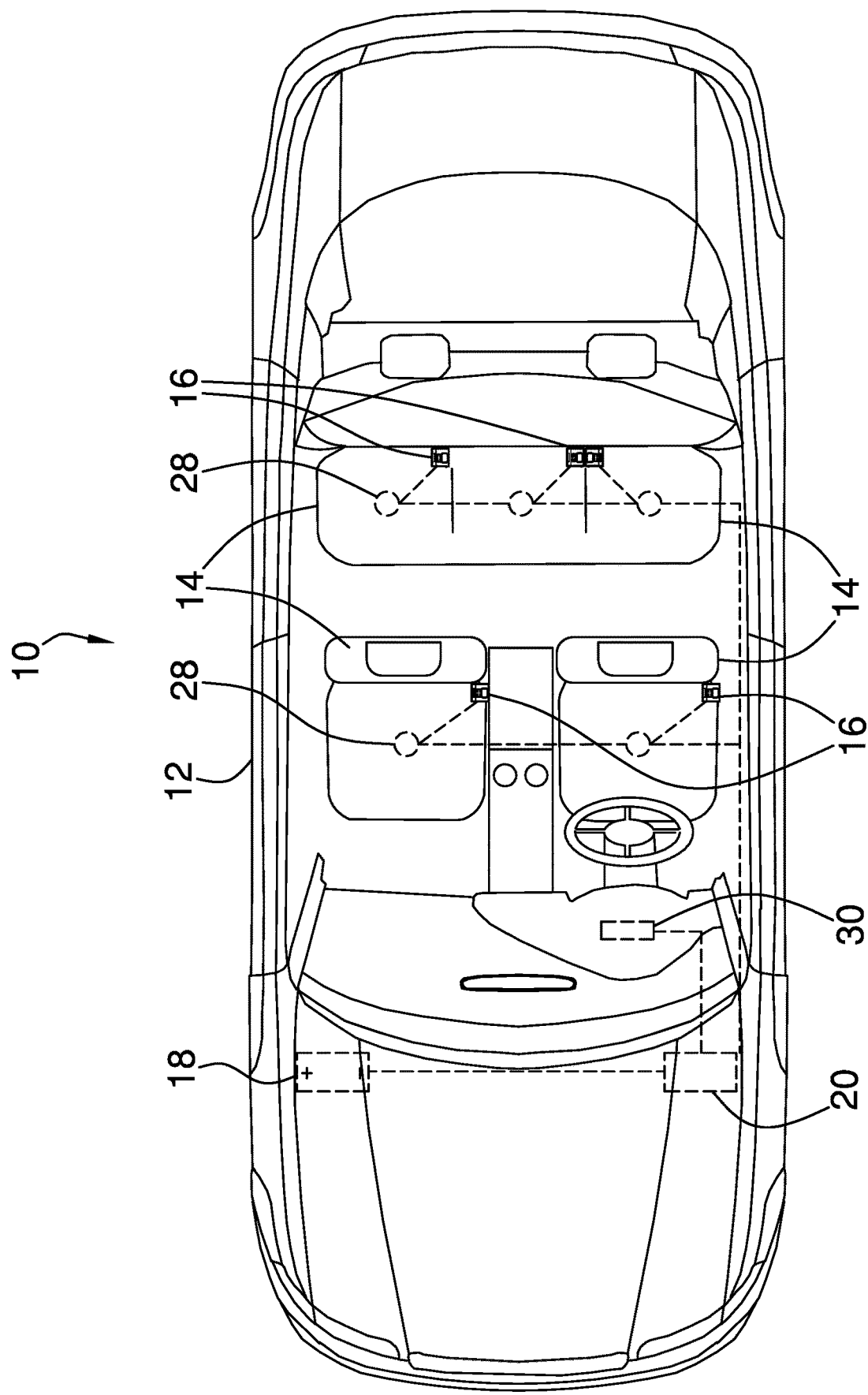
FIG. 3 is a top perspective view of an embodiment of the disclosure.
Figure 4:
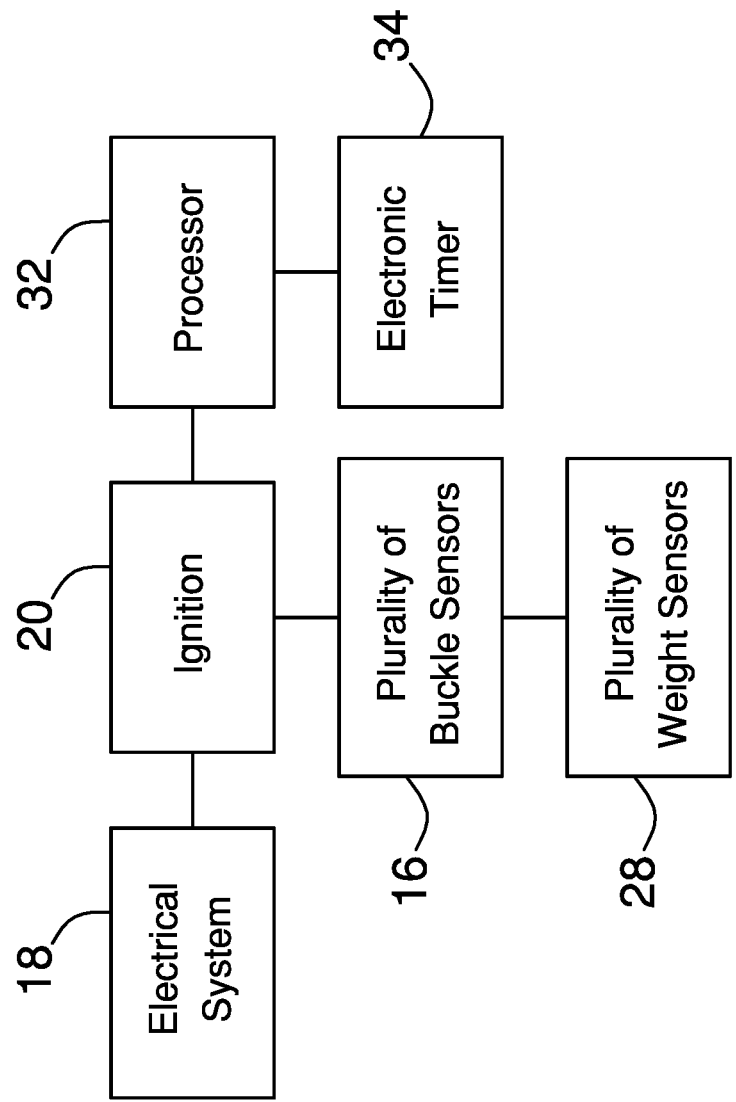
FIG. 4 is a schematic view of an embodiment of the disclosure.

With reference now to the drawings, and in particular to FIGS. 1 through 4 thereof, a new warning device embodying the principles and concepts of an embodiment of the disclosure and generally designated by the reference numeral 10 will be described.

As best illustrated in FIGS. 1 through 4, the vehicle safety system 10 generally comprises a vehicle 12 that has a plurality of seats 14, a plurality of seat belts 16, an electrical system 18 and an ignition 20. The vehicle 12 may be a passenger vehicle, a cargo vehicle and any other vehicle that is driven on a roadway and conforms to federal and state vehicle safety laws. Each of the seat belts 16 includes a buckle 22 and a clasp 24. The buckle 22 corresponding to each of the seat belts 16 insertably receives the clasp 24 of the corresponding buckle 22. Moreover, each of the seat belts 16 is positioned on an associated one of the seats 14.

A plurality of buckle sensors 26 is provided and each of the buckle sensors 26 is coupled to the buckle 22 on an associated one of the seat belts 16. Each of the buckle sensors 26 senses when the clasp 24 of the associated seat belt is engaged to the buckle 22 of the associated seat belt. Each of the buckle sensors 26 may be a seat belt sensor of any conventional design that is common to vehicles.

A plurality of weight sensors 28 is provided and each of the weight sensors 28 is coupled to an associated one of the seats 14. Thus, each of the weight sensors 28 may sense weight of an occupant in the associated seat 14. Each of the weight sensors 28 may be an electronic weight sensor or the like. Additionally, each of the weight sensors 28 may have a minimum threshold weight of approximately 4.5 kg.

A shut down unit 30 is provided and the shut down unit 30 is coupled to the vehicle 12. The shut down unit 30 is in electrical communication with each of the buckle sensors 26, each of the weight sensors 28 and the ignition 20. The shut down unit 30 turns the ignition 20 off when any of the weight sensors 28 senses an occupant in an associated of the seats 14 and the buckle 22 sensor corresponding to the associated seat 14 does not sense the seat belt 16 of the associated seat 14 is fastened. In this way the shut down unit 30 inhibits the vehicle 12 from being driven when an occupant is not wearing a seat belt 16.

The shut down unit 30 comprises a processor 32 that is coupled to the vehicle 12. The processor 32 is electrically coupled to the electrical system 18 and the ignition 20. Each of the buckle sensors 26 is electrically coupled to the processor 32 and each of the weight sensors 28 is electrically coupled to the processor 32. The processor 32 selectively generates a shut down sequence when an unsafe condition is met. The processor 32 turns the ignition 20 off when the processor 32 generates the shut down sequence. The unsafe condition is defined by any of the weight sensors 28 sensing weight of the occupant in an associated seat 14 and the buckle 22 sensor of the associated seat 14 does not sense that the seat belt 16 of the associated seat 14 is fastened. The processor 32 may be an electronic processor 32 or the like.

An electronic timer 34 is coupled to the vehicle 12 and the electronic timer 34 is electrically coupled to the processor 32. The electronic timer 34 counts down a trigger duration of time when the unsafe condition is met. Moreover, the processor 32 generates the shut down sequence when the electronic timer 34 counts down the trigger duration of time. Thus, the processor 32 shuts off the ignition 20 when the unsafe condition is met and the electronic timer 34 counts down the trigger duration of time. The trigger duration of time may range between approximately 4.0 minutes and 5.0 minutes.

In use, each of the weight sensors 28 senses the weight of the occupant in the associated seat 14. Additionally, the buckle sensors 26 sense when the associated seat belt 16 is fastened. The electronic timer 34 begins counting down the trigger duration of time when the unsafe condition is met when the vehicle 12 is running. Additionally, the processor 32 generates the shut down sequence when the trigger duration of time has elapsed and the unsafe condition remains. Thus, the processor 32 turns the ignition 20 off thereby inhibiting the vehicle 12 from being driven until all occupants are wearing their respective seat belts 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle safety system being configured to ensure seatbelts in a vehicle are worn when said vehicle is driven, said system comprising:

a vehicle having a plurality of seats, a plurality of seat belts, an electrical system and an ignition, each of said seat belts including a buckle and a clasp, said buckle corresponding to each of said seat belts insertably receiving said clasp of said corresponding buckle, each of said seat belts being positioned on an associated one of said seats;

a plurality of buckle sensors, each of said buckle sensors being coupled to said buckle on an associated one of said seat belts, each of said buckle sensors sensing when said clasp of said associated seat belt is engaged to said buckle of said associated seat belt;

a plurality of weight sensors, each of said weight sensors being coupled to an associated one of said seats wherein each of said weight sensors is configured to sense weight of an occupant in said associated seat; and a shut down unit being coupled to said vehicle, said shut down unit being in electrical communication with each of said seat belt sensors, each of said weight sensors and said ignition, said shut down unit turning said ignition off when any of said weight sensors senses an occupant in an associated of said seats and said buckle sensor corresponding to said associated seat does not sense said seat belt of said associated seat is fastened, said shut down unit comprising a processor being coupled to said vehicle, said processor being electrically coupled to said electrical system and said ignition, each of said buckle sensors being electrically coupled to said processor, each of said weight sensors being electrically coupled to said processor, and an electronic timer being coupled to said vehicle, said electronic timer being electrically coupled to said processor, said electronic timer counting down a trigger duration of time when said unsafe condition is met, said processor generating said shut down sequence when said electronic timer counts down said trigger duration of time such that said processor shuts off said ignition, said duration of time being between 4 minutes and 5 minutes.

2. The assembly according to claim 1, wherein said processor selectively generating a shut down sequence when an unsafe condition is met, said processor turning said ignition off when said processor generates said shut down sequence.

3. The assembly according to claim 1, wherein said unsafe condition is defined by any of said weight sensors sensing weight of the occupant in an associated seat and said buckle sensor of said associated seat does not sense that said seat belt of said associated seat is fastened.

4. A vehicle safety system being configured to ensure seatbelts in a vehicle are worn when said vehicle is driven, said system comprising:

a vehicle having a plurality of seats, a plurality of seat belts, an electrical system and an ignition, each of said seat belts including a buckle and a clasp, said buckle corresponding to each of said seat belts insertably receiving said clasp of said corresponding buckle, each of said seat belts being positioned on an associated one of said seats;

a plurality of buckle sensors, each of said buckle sensors being coupled to said buckle on an associated one of said seat belts, each of said buckle sensors sensing when said clasp of said associated seat belt is engaged to said buckle of said associated seat belt;

a plurality of weight sensors, each of said weight sensors being coupled to an associated one of said seats wherein each of said weight sensors is configured to sense weight of an occupant in said associated seat; and a shut down unit being coupled to said vehicle, said shut down unit being in electrical communication with each of said seat belt sensors, each of said weight sensors and said ignition, said shut down unit turning said ignition off when any of said weight sensors senses an occupant in an associated of said seats and said buckle sensor corresponding to said associated seat does not sense said seat belt of said associated seat is fastened, said shut down unit comprising:

a processor being coupled to said vehicle, said processor being electrically coupled to said electrical system and said ignition, each of said buckle sensors being electrically coupled to said processor, each of said weight sensors being electrically coupled to said processor, said processor selectively generating a shut down sequence when an unsafe condition is met, said processor turning said ignition off when said processor generates said shut down sequence, said unsafe condition being defined by any of said weight sensors sensing weight of the occupant in an associated seat and said buckle sensor of said associated seat does not sense that said seat belt of said associated seat is fastened; and an electronic timer being coupled to said vehicle, said electronic timer being electrically coupled to said processor, said electronic timer counting down a trigger duration of time when said unsafe condition is met, said processor generating said shut down sequence when said electronic timer counts down said trigger duration of time such that said processor shuts off said ignition said duration of time being between 4 minutes and 5 minutes.

* * * * *